(12) United States Patent
Quilter et al.

(10) Patent No.: US 8,356,089 B1
(45) Date of Patent: *Jan. 15, 2013

(54) NETWORK SERVICES PLATFORM

(75) Inventors: Alexander L. Quilter, Cary, NC (US);
Oliver Lavery, Toronto, CA (US);
David J. Meltzer, Roswell, GA (US);
Timothy D. Keanini, Austin, TX (US)

(73) Assignee: nCircle Network Security, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/531,248

(22) Filed: Jun. 22, 2012

Related U.S. Application Data

(63) Continuation of application No. 12/825,305, filed on Jun. 28, 2010, now Pat. No. 8,230,071.

(51) Int. Cl.
*G06F 15/16* (2006.01)
*G06F 15/173* (2006.01)
*G06F 15/177* (2006.01)

(52) U.S. Cl. ........ 709/222; 709/226; 709/228; 709/231; 709/238

(58) Field of Classification Search .................. 709/217, 709/220, 223, 228, 230; 370/254, 316, 338, 370/389
See application file for complete search history.

(56) References Cited

U.S. PATENT DOCUMENTS

| | | | |
|---|---|---|---|
| 6,385,647 B1 * | 5/2002 | Willis et al. | 709/217 |
| 6,584,082 B1 * | 6/2003 | Willis et al. | 370/316 |
| 6,950,875 B1 * | 9/2005 | Slaughter et al. | 709/230 |
| 7,698,398 B1 * | 4/2010 | Lai | 709/228 |
| 7,831,693 B2 * | 11/2010 | Lai | 709/220 |
| 7,894,428 B2 * | 2/2011 | Yamane | 370/389 |
| 8,111,632 B2 * | 2/2012 | Galan Marquez et al. | 370/254 |
| 2005/0044197 A1 * | 2/2005 | Lai | 709/223 |
| 2011/0019654 A1 * | 1/2011 | Harmatos et al. | 370/338 |

* cited by examiner

*Primary Examiner* — Quang N. Nguyen
(74) *Attorney, Agent, or Firm* — Fenwick & West LLP

(57) ABSTRACT

A network services platform provides services to remote enterprise networks. The services platform provides a control module to a computer in the enterprise network. The control module executes on the computer and interacts with the services platform to establish an Internet Protocol (IP) tunnel between the services platform and the computer. The control module also establishes a bridge between the IP tunnel and the enterprise network. The services platform allocates a unique private IP address space to the enterprise network, and translates IP addresses in network communications between enterprise network addresses and corresponding services platform addresses in the allocated unique private address space. The services platform provides network services to the enterprise network via the IP tunnel and bridge.

14 Claims, 5 Drawing Sheets

NETWORK SERVICES PLATFORM

CROSS-REFERENCE TO RELATED APPLICATIONS

This application is a continuation of U.S. patent application Ser. No. 12/825,305, filed Jun. 28, 2010, now U.S. Pat. No. 8,230,071, issued Jul. 24, 2012, the entire contents of which are hereby incorporated by reference.

BACKGROUND OF THE INVENTION

1. Field of the Invention

This invention pertains in general to computer networks and in particular to providing network services to remote enterprise networks.

2. Description of the Related Art

Many enterprises, such as businesses, schools, and government agencies, operate computer networks. Best practices dictate that these networks be maintained in a manner compliant with security and other policies. Malicious entities frequently attempt to compromise enterprise networks in order to perform malicious tasks such as obtaining confidential information, destroying data, and taking control of networked computers for use in subsequent attacks.

Usually, a network administrator is tasked with maintaining security on the enterprise network. There are a variety of network analysis tools that the administrator can use to secure or otherwise maintain the network. These tools are often provided as "appliances" that the administrator can install within the enterprise network in order to maintain it. While appliance-based tools work well, such tools are often designed for and marketed to large enterprises. For example, the tools can be designed to maintain an enterprise network having thousands of devices and may cost thousands of dollars. Therefore, these types of appliance-based tools are often impractical and unaffordable for smaller enterprises with, e.g., fewer than 100 network devices.

A cloud-based tool that remotely analyzes an enterprise network is one alternative to appliance-based tools. However, in the typical case it is not possible to reach the enterprise network from the cloud because the network is hidden behind a router or other device that prevents remote inspection. Oftentimes, the enterprise network is connected to the Internet using a router that performs network address translation (NAT) and/or contains a firewall. Such a router hides the internals of the enterprise network. Thus, a cloud-based tool cannot "see" the enterprise network with the level of detail needed to provide network services.

BRIEF SUMMARY

The above and other issues are addressed by a method, services platform, and computer-readable storage medium storing executable computer program modules that provide a network service to a remote enterprise network. An embodiment of the method comprises using a computer to perform steps comprising providing a control module to an endpoint of the remote enterprise network. Responsive to execution of the control module on the endpoint, an Internet Protocol (IP) tunnel is established between the services platform and the endpoint. Additionally, a bridge is established between the IP tunnel and the enterprise network responsive to the execution of the control module on the endpoint. The network service is provided to the enterprise network via the IP tunnel and bridge.

An embodiment of the services platform comprises a non-transitory computer-readable storage medium storing executable computer program modules. The modules are for performing steps comprising providing a control module to an endpoint of the remote enterprise network. Responsive to execution of the control module on the endpoint, an Internet Protocol (IP) tunnel is established between the services platform and the endpoint. Additionally, a bridge is established between the IP tunnel and the enterprise network responsive to the execution of the control module on the endpoint. The network service is provided to the enterprise network via the IP tunnel and bridge. The services platform also comprises a computer processor for executing the computer program modules.

An embodiment of the computer-readable storage medium stores executable computer program modules. The modules comprise an interaction module for interacting with a user of an endpoint of the enterprise network to enable the user to request the network service from the services platform and a tunnel creation module for creating an IP tunnel between the endpoint and the services platform. The modules also comprise a bridging module for bridging the IP tunnel with the enterprise network. The services platform provides the requested network service via the IP tunnel bridged with the enterprise network.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

Figure 1:
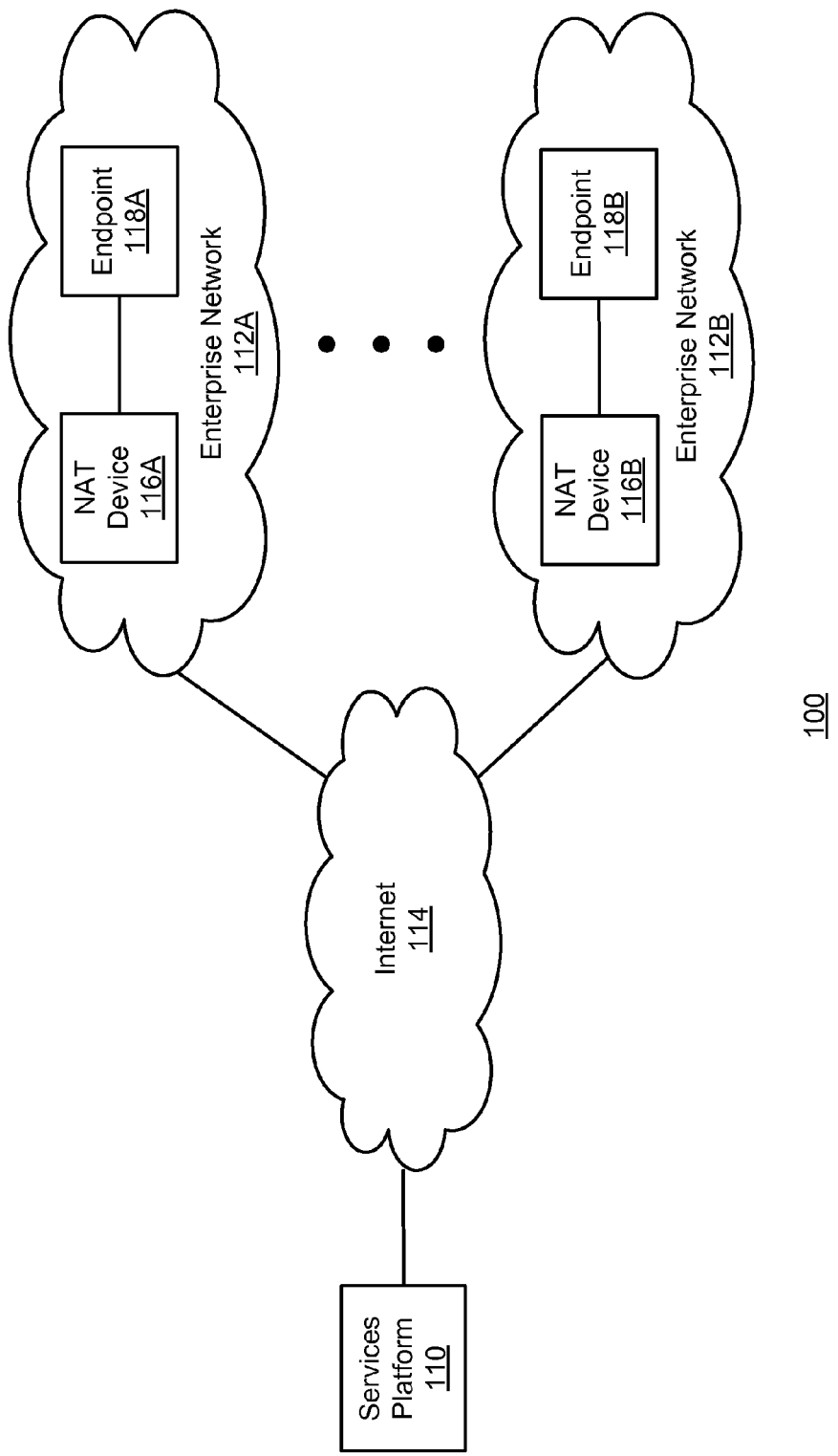
FIG. 1 is a high-level block diagram of a computing environment according to one embodiment.

FIG. 1 is a high-level block diagram of a computing environment 100 according to one embodiment. FIG. 1 illustrates a services platform 110 and two enterprise networks 112A, 112B connected by the Internet 114. Only two enterprise networks 112 are illustrated in FIG. 1 in order to simplify and clarify the description. Embodiments of the computing environment 100 can have many such enterprise networks connected to the Internet 114. Some embodiments also have multiple services platforms 110.

FIG. 1 and the other figures use like reference numerals to identify like elements. A letter after a reference numeral, such as "112A," indicates that the text refers specifically to the element having that particular reference numeral. A reference numeral in the text without a following letter, such as "112," refers to any or all of the elements in the figures bearing that reference numeral (e.g. "112" in the text refers to reference numerals "112A" and/or "112B" in the figures).

As illustrated, an enterprise network 112 includes a network address translation (NAT) device 116, such as a router, and an endpoint 118. The endpoint 118 is a device such as a client computer, printer, scanner, fax machine, Internet Protocol (IP)-based telephone, etc. Moreover, for purposes of this description the term "endpoint" can also encompass routers and other intermediate nodes. While FIG. 1 shows only one endpoint 118 within each enterprise network, a typical small enterprise network might contain between 10-100 endpoints and a larger network can contain many more. In one embodiment, each endpoint 118 within the enterprise network 112 has an associated IP address. Typically, the enterprise assigns the endpoints 118 to an address within an enterprise IP address space designated as "private" (e.g., 10.xx . . . , 172.16.xx . . . , or 192.168.xxx).

The NAT device 116 uses IP address translation to hide the enterprise network 112 behind a single IP address. In one embodiment, the NAT device 116 uses stateful translation tables to map IP addresses of endpoints 118 within the enterprise network 112 into a single address and then rewrites outgoing IP packets so that they appear to originate from the NAT device at that single address. The NAT device 116 uses the translation tables to rewrite incoming IP packets back to the IP addresses of the endpoints 118 to which the packets are directed. The NAT device 116 may include additional functionality, such as a firewall that blocks certain types of communications.

The services platform 110 includes one or more server computers and provides network analysis and other types of network services to enterprises having enterprise networks 112. The network services can include, for example, endpoint inventorying, vulnerability management, configuration auditing, compliance auditing, file integrity monitoring, metrics, and reporting. Other embodiments provide different and/or additional services.

The services platform 110 is remote (i.e., separate) from the enterprise networks 112 and provides the services to the enterprises via the Internet 114. To this end, the services platform 110 interacts directly with an endpoint 118, typically a client computer, within an enterprise network 112. In one embodiment, the services platform 110 connects with the endpoint 118 via an IP tunnel through the NAT device 116. In addition, the services platform 110 bridges the IP tunnel with the enterprise network 112, which allows the platform to observe enterprise network traffic received by the endpoint 118 and send traffic onto the enterprise network. Through the IP tunnel and network bridge, the services platform 110 can bypass the issues introduced by the NAT device 116 and directly interact with the enterprise network 112 in order to provide network services.

The Internet 114 is the communication pathway between the services platform 110 and enterprise networks 112. The Internet 114 uses standard communications technologies and/or protocols. Thus, the Internet 114 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the Internet 114 can include multiprotocol label switching (MPLS), the transmission control protocol/Internet protocol (TCP/IP), the Internet control message protocol (ICMP), the User Datagram Protocol (UDP), the hypertext transport protocol (HTTP), the simple mail transfer protocol (SMTP), the file transfer protocol (FTP), etc. The data exchanged over the Internet 114 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In other embodiments, the services platform 110 communicates with the enterprise networks 112 using custom and/or dedicated data communications technologies instead of, or in addition to, the ones described above. Likewise, the services platform 110 and enterprise networks 112 can communicate using private links that are not necessary part of the larger Internet.

Figure 2:
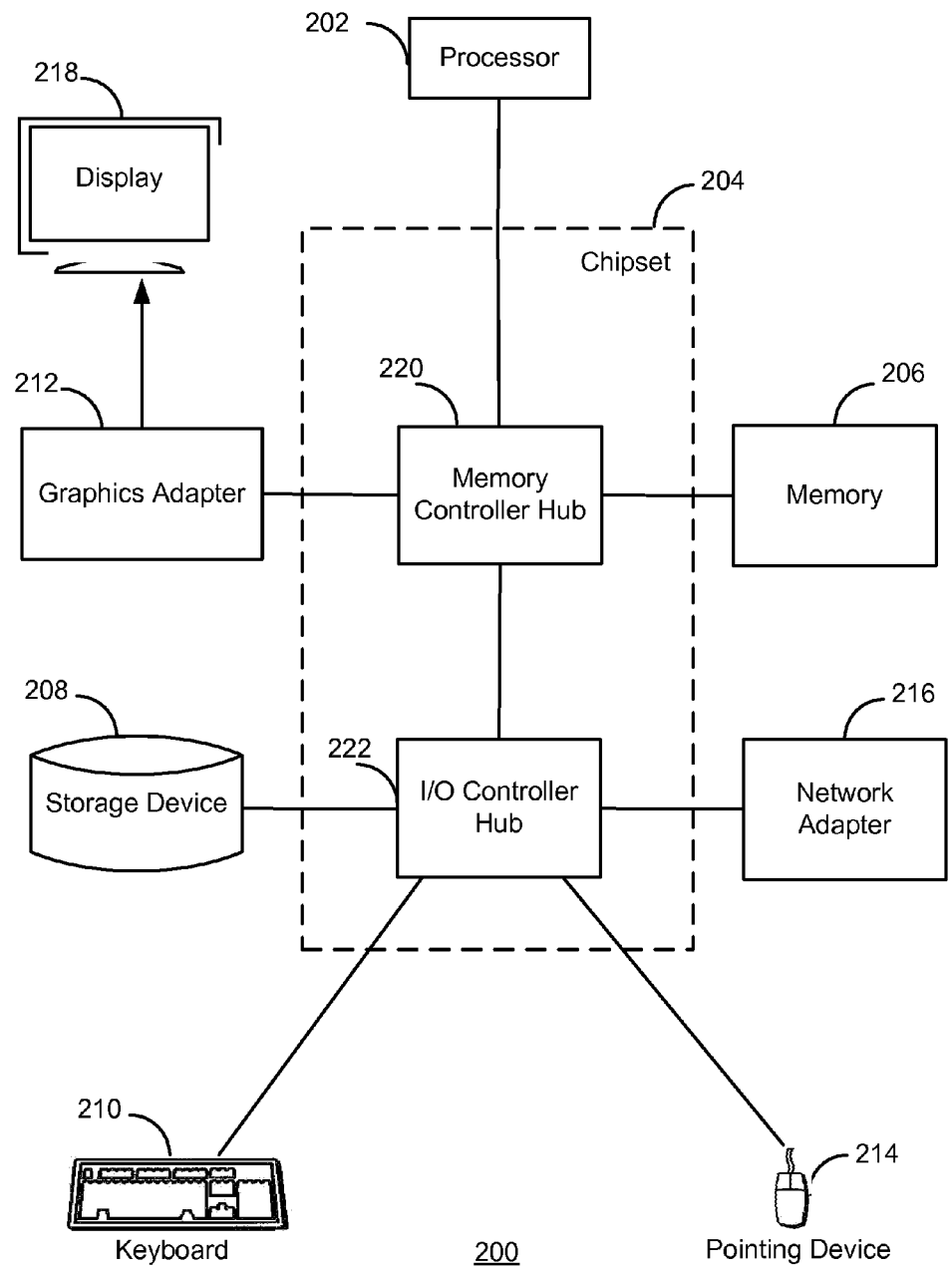
FIG. 2 is a high-level block diagram illustrating a typical computer for use as a server implementing the services platform and/or as an endpoint in an enterprise network.

FIG. 2 is a high-level block diagram illustrating a typical computer 200 for use as a server implementing the services platform and/or as an endpoint 118 in an enterprise network 118. Illustrated are a processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is a non-transitory computer-readable storage medium, such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display 218. The network adapter 216 couples the computer system 200 to the network 116.

As is known in the art, a computer 200 can have different and/or other components than those shown in FIG. 2. In addition, the computer 200 can lack certain illustrated components. In one embodiment, a computer 200 acting as the services platform 110 one of multiple blade computers implementing the platform and lacks a keyboard 210, pointing device 214, graphics adapter 212, and/or display 218. Moreover, the storage device 208 can be local and/or remote from the computer 200 (such as embodied within a storage area network (SAN)).

This description uses the term "module" to refer to computer program logic for providing a specified functionality. A module can be implemented in hardware, firmware, and/or software. A module is typically stored on a computer-readable storage medium such as the storage device 208, loaded into the memory 206, and executed by the processor 202.

Figure 3:
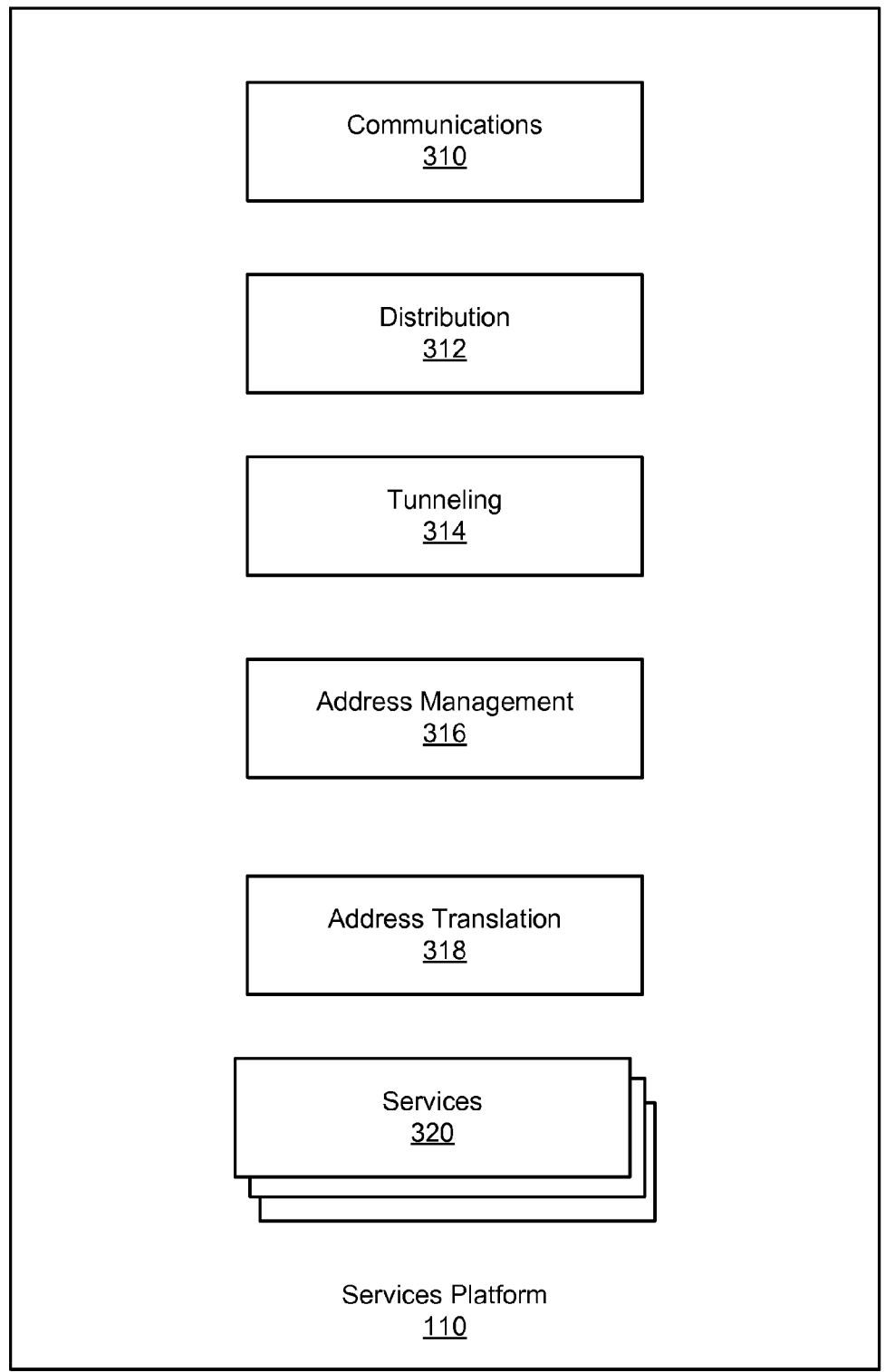
FIG. 3 is a high-level block diagram illustrating a detailed view of the services platform according to one embodiment.

FIG. 3 is a high-level block diagram illustrating a detailed view of the services platform 110 according to one embodiment. As shown in FIG. 3, the services platform 110 includes multiple modules. In some embodiments, the functions are distributed among these modules in a different manner than described herein. In addition, some embodiments have different and/or additional modules than the ones shown in FIG. 3.

A communications module 310 communicates with an endpoint 118 at an enterprise network 112. In one embodiment, the communications module 310 includes a web server that provides web pages in response to HTTP requests from a browser executing on the endpoint 118. The web pages can, e.g., present a user of the endpoint 118 with instructions for obtaining network services, describe available services, allow the user to provide information about the enterprise network, and facilitate payment for the services. In addition, the web pages can present the user with the results of any performed services, such as the results of a compliance audit of the enterprise network 112. The web pages can also provide functionality for downloading modules from the services platform 110 to the endpoint 118.

A distribution module 312 provides a control module to endpoints 118 in enterprise networks 112 for facilitating the services provided by the services platform 110. In one embodiment, the control module is provided to the endpoint 118 used by the user to interact with the services platform. The control module executes on the endpoint 118, configures the endpoint, and communicates with the services platform to enable the network services. In one embodiment, the control module, at the direction of the services platform 110, causes the endpoint 118 to open the IP tunnel with the services platform. In addition, the control module bridges the IP tunnel with the enterprise network 112. Further, in some embodiments, the control module performs one or more of the functions attributed to the web pages provided by the communications module 310 discussed above, such as providing a menu of available services to the user.

A tunneling module 314 communicates with the endpoints 118 of enterprise networks 112 via IP tunnels. In essence, an IP tunnel uses packet encapsulation to establish a network link between an enterprise network endpoint 118 and the tunneling module 314. Thus, the services platform 110 can use the IP tunnel to directly communicate with the endpoint 118 of an enterprise network 112 even though the tunnel passes through the NAT device 116 of the enterprise. Since the control module at the endpoint 118 establishes the IP tunnel with the tunneling module 314 in one embodiment, the tunnel essentially tunnels out of the enterprise network 112 to the tunneling module 314. The IP tunnel can be secure and form a VPN.

An address management module 316 manages IP address spaces of enterprise networks 118 receiving services from the services platform 110. As mentioned above, each enterprise network 112 likely uses IP addresses within one of a limited number of private address spaces for its endpoints 118. Therefore, different enterprise networks 112 are likely to use the same private address space, and assign the same IP addresses to different endpoints 118. For example, the network of one enterprise might use address 192.168.1.10 for a printer while another enterprise uses the same address for a client computer. Since network analysis services often use IP addresses to help identify discrete endpoints 118, such services can fail to work properly if different endpoints have the same IP address.

To address this issue, the address management module 316 allocates a unique private IP address space for each enterprise network 112 obtaining services from the services platform 110. In one embodiment, the address management module 316 initially allocates each enterprise network 112 a specified number of addresses, e.g., 254 addresses, within the address space. For example, an enterprise network 112 can be assigned the range of addresses from 10.0.0.0 to 10.0.0.255. In one embodiment, the address management module 316 assigns the IP address space to an enterprise network 112 when an endpoint 118 of the network initially contacts the services platform 110. In another embodiment, the address management module 316 assigns the IP address space when the IP tunnel is established between the endpoint 118 of the enterprise network 112 and the tunneling module 314.

The address management module 316 assigns each endpoint 118 identified within an enterprise network 112 to an IP address within that network's allocated unique private IP address space. This assigned address is called the "services platform address." If the number of endpoints within an enterprise network 112 exceeds the number of addresses within the unique private address space allocated for that network, the address management module 316 subsequently allocates additional addresses to the enterprise network 112. Likewise, the address management module 316 can release allocated addresses that are not required for an enterprise network 112.

An address translation module 318 provides a translation layer that maps network addresses between the IP address spaces used by the enterprise networks 112 and the unique services platform addresses assigned to the endpoints 118 of the enterprise networks 112 by the address management module 316. For example, assume endpoint 118A has the address 192.168.0.2 within enterprise network 112A, and that the address management module 316 has reserved addresses 10.0.1.0-10.0.1.255 for the enterprise network and assigned endpoint 118A the services platform address of 10.0.1.10. In this case, the address translation module 318 alters any inbound network traffic received via the IP tunnel from enterprise network 112A that references endpoint 118A to use the services platform address, 10.0.1.10, instead of the enterprise network address, 192.168.0.2. Likewise, the address translation module 318 alters outbound traffic destined for enterprise network 112A via the IP tunnel to reference endpoint 118A using the enterprise network address instead of the services platform address.

If another enterprise network 112B has an endpoint 118B that also uses the address 192.168.0.2, then the address management module 316 will assign that endpoint a unique services platform address (e.g., 10.0.2.0). The address translation module 318, in turn, will alter any traffic outbound to the enterprise network 112B to use the enterprise network address of 192.168.0.2, and will alter any traffic inbound from that enterprise network to use the services platform address.

A set of services modules (collectively identified by reference numeral 320) provide network analysis and other types of network services to the enterprise networks 112. As mentioned above, these services can include endpoint inventorying, vulnerability management, configuration auditing, compliance auditing, file integrity monitoring, metrics, and reporting. In one embodiment, a network analysis module 320 that performs endpoint inventorying of the enterprise networks is executed once an IP tunnel with the enterprise network 112 is established. This inventorying module identifies all of the endpoints 118 on the enterprise network 112, and through its actions causes each endpoint to receive a unique services platform IP address from the address management module 316. Other services modules 320 then perform various services on the inventoried endpoints. Likewise, the address management module 316 can allocate and release IP addresses based on the inventoried endpoints.

In one embodiment, network traffic between the enterprise networks 112 and the services modules 320 passes through the IP tunnel established by the tunneling module 314 and through the translation layer provided by the address translation module 318. As a result, the services modules 320 identify endpoints 118 using the endpoints' services platform addresses. Thus, from the perspective of the services modules 320, every endpoint 118 has a unique address, regardless of the addresses assigned to the endpoints in the endpoints' respective enterprise networks 112. Using unique addresses advantageously allows services modules 320 to simultaneously provide services to multiple enterprise networks, without requiring configuring the services modules 320 to account for multiple endpoints having the same IP address.

Figure 4:
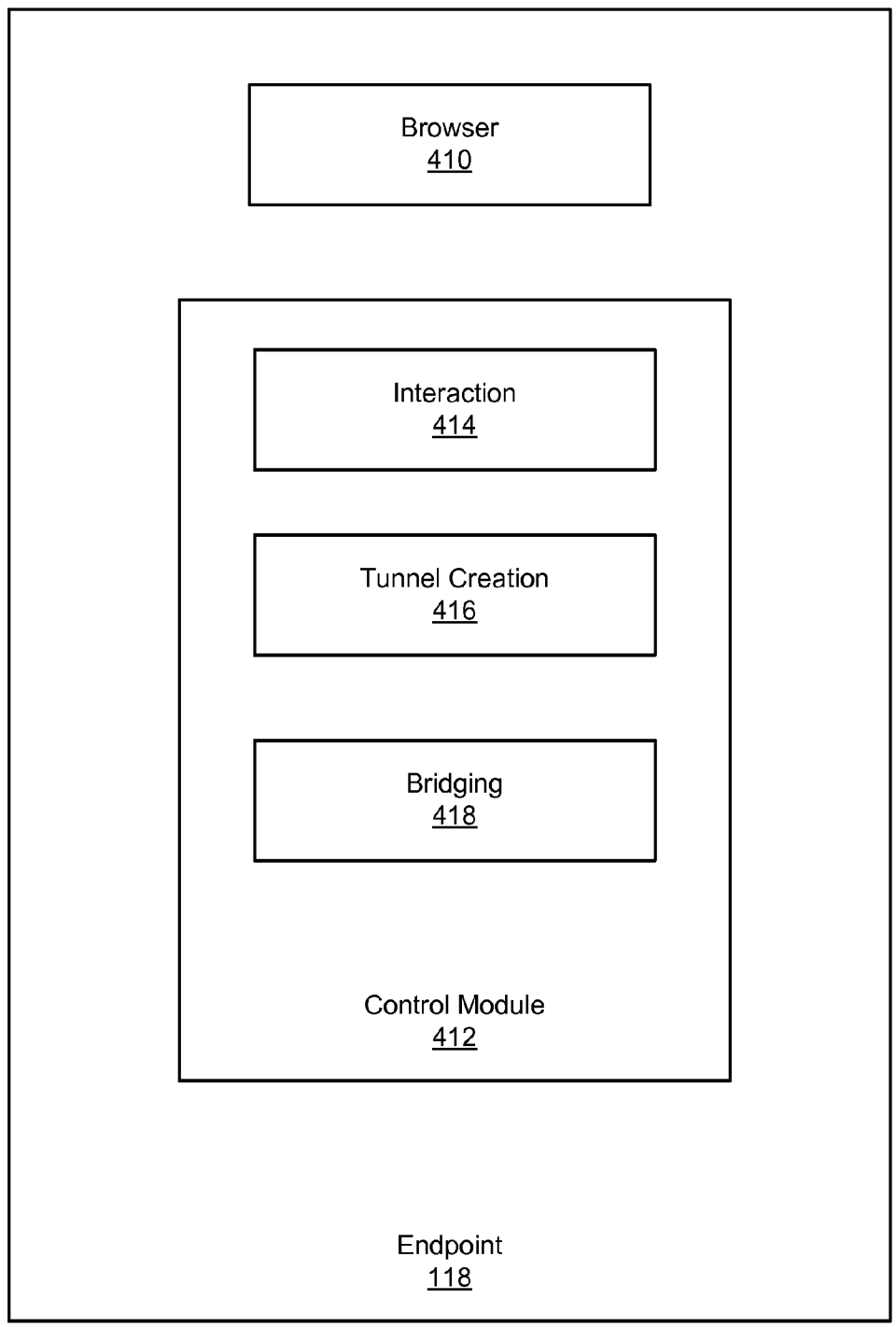
FIG. 4 is a high-level block diagram illustrating a detailed view of an endpoint within an enterprise network according to one embodiment.

FIG. 4 is a high-level block diagram illustrating a detailed view of an endpoint 118 within an enterprise network 112 according to one embodiment. The endpoint 118 illustrated in FIG. 4 represents the endpoint used by a user, such as an administrator of the enterprise network 112, to access the services platform 110. In one embodiment the endpoint 118 is a computer. As shown in FIG. 4, the endpoint 118 includes multiple modules. Other endpoints 118 within the enterprise network 112 may have different and/or additional modules than the ones shown in FIG. 4. In addition, in some embodiments the functions are distributed among the modules shown in FIG. 4 in a different manner than is described herein.

The endpoint includes a browser module 410. The browser module 410 allows the user to retrieve and display content from web servers and other computers on the network 114. In one embodiment, the browser module 410 includes a conventional web browser such as MICROSOFT INTERNET EXPLORER, APPLE SAFARI, GOOGLE CHROME, or MOZILLA FIREFOX. As mentioned above, the user uses the browser module 410 to contact the services platform 110 and view web pages for obtaining services, downloading the control module, and performing other performing tasks In addition, the endpoint 118 includes the control module 412. The control module 412 represents the control module downloaded to the endpoint 118 by the distribution module 312 of the services platform 110. The control module 412 includes an interaction module 414 for interacting with the user to perform functions such as displaying information to, and receiving input from, the user. Depending upon the embodiment, the interaction module 414 can interact with the browser module 410 to cause the browser to retrieve web pages from the services platform 110 and/or can independently generate a user interface (UI) on the endpoint 118 for interacting with the user.

The control module 412 additionally includes a tunnel creation module 416. The tunnel creation module 416 creates an IP tunnel between the endpoint 118 and the services platform 110. For example, the tunnel can be created in response to the user interacting with the interaction module 412 and requesting a service from the services platform 110.

In one embodiment, the tunnel creation module 416 creates the IP tunnel from the endpoint 118 to the services platform 110. The tunnel is formed at the data link layer (i.e., layer two) of the Open System Interconnection (OSI) model and uses the IP address of the endpoint 118. This usage is in contrast to a typical scenario where an entity tunnels into an enterprise network 112 and receives an IP address from a Dynamic Host Configuration Protocol (DHCP) server within the enterprise.

The control module 412 also includes a bridging module 418 for bridging the IP tunnel with the enterprise network 112. In one embodiment, the bridging module 418 uses packet injection functionality to create the bridge onto the enterprise network. This functionality injects network traffic packets from the IP tunnel onto the enterprise network. In addition, the bridging module 418 sends captured packets from the enterprise network into the IP tunnel.

In one embodiment, the packet injection functionality is incorporated into an injection driver within the bridging module 418. In another embodiment, the packet injection functionality is already present at the endpoint 118. In this latter embodiment, the bridging module 418 includes functionality that causes the interaction module 414 to prompt the user to activate packet injection functionality already present at the endpoint 118. For example, endpoints executing certain versions of the MICROSOFT WINDOWS operating system (OS) include packet injection capabilities within the OS, specifically as part of the Windows Filtering Platform (WFP). However, these capabilities must be manually activated by the user at the endpoint 118. The bridging module 418 thus causes the user to activate WFP packet injection.

Once activated, the packet injection functionality bridges the IP tunnel with the enterprise's local network. All enterprise network traffic received by the endpoint 118 is captured and sent through the IP tunnel. In addition, all traffic received by the endpoint 118 via the IP tunnel is injected onto the enterprise network 112. Moreover, the traffic injected from the IP tunnel onto the enterprise network 112 appears to originate from the endpoint 118.

The services platform 110 is thus able to access the enterprise network 112 as if the services platform were directly connected to the network. In this way, the services platform 110 is able to provide network services to the enterprise even though the enterprise network is connected to the Internet 114 using a NAT device 116.

Figure 5:
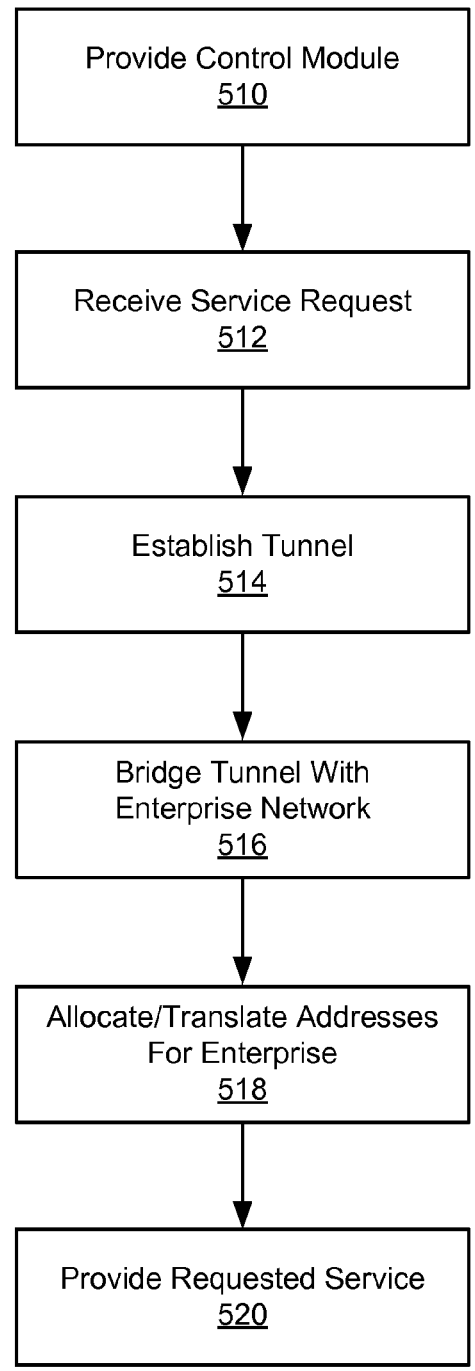
FIG. 5 is a flow chart illustrating steps performed by one embodiment of the services platform to provide services to an enterprise network.

FIG. 5 is a flow chart illustrating steps performed by one embodiment of the services platform 110 to provide services to an enterprise network 112. Other embodiments can perform different and/or additional steps. Moreover, other embodiments can perform the steps in different orders. Further, some or all of the steps can be performed by entities other than the services platform 110.

Assume that a user of an endpoint 118 in an enterprise network 112 uses the endpoint to contact the services platform 110. For example, the user can use a browser 410 on the endpoint 118 to interact with a web server provided by the services platform 110. In response to these interactions, the services platform 110 provides 510 a control module 412 to the endpoint 118. The user can interact with the web server and/or control module 412 to request a service from the services platform 110. The services platform 110 receives 512 the service request and interacts with the control module 412 to provide the requested service.

To provide the service, the services platform 110 interacts with the control module to establish 514 an IP tunnel with the endpoint 118. In one embodiment, the control module 412 opens an IP tunnel to the services platform 110. The IP tunnel is a layer two connection. In addition, the services platform 110 interacts with the control module 412 to bridge 516 the IP tunnel with the enterprise network 112. In one embodiment, the control module 412 creates the bridge by using packet injection to inject packets from the IP tunnel onto the enterprise network 112. In addition, the control module 412 captures packets received by the endpoint 118 from the enterprise network and sends the packets through the IP tunnel. The packet injection/capturing functionality can reside within the control module 412, within the OS of the endpoint 118, or elsewhere.

The services platform 110 allocates 518 a unique private IP address space for the enterprise network 112. For example, the address space can span the range from 10.0.0.0 to 10.0.0.255. The services platform 110 assigns the endpoint 118 a services platform address within this address space. Any other endpoints discovered on the enterprise network 112 are also assigned services platform addresses within the allocated address space. In addition, the services platform 110 translates 518 addresses in communications between the services platform and the enterprise network 112 between the services platform address and the address space used by the enterprise network.

The services platform 110 provides 520 the requested network service or services to the enterprise network 112. In one embodiment, the services platform 110 provides the services by using the IP tunnel to directly communicate with endpoints 118 on the enterprise network 112, thereby avoiding potential addressing issues from any NAT devices 116 employed by the enterprise network. The services platform 110 can thus access the enterprise network 112 as if it were directly coupled to the network.

The technique described above allows the services platform 110 to simultaneously provide network services to multiple enterprise networks 112. The use of a unique private address space for each enterprise network 112, and the translation between the address spaces, abstracts the true address spaces used by the enterprise networks from the services platform addresses used by the services modules 320 on the services platform. From the perspective of the services modules 320, endpoints 118 on different enterprise networks 112 are merely endpoints with different addresses.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of using a services platform to provide a network service to a remote enterprise network, comprising:
   using a computer to perform steps comprising:
   providing a control module to an endpoint of the remote enterprise network responsive to a request for the network service from a user of the endpoint;
   establishing an Internet Protocol (IP) tunnel between the services platform and the endpoint responsive to execution of the control module on the endpoint;
   establishing a bridge between the IP tunnel and the enterprise network responsive to the execution of the control module on the endpoint, wherein establishing the bridge comprises the control module using packet injection at the endpoint to inject packets from the IP tunnel to the enterprise network, the packets injected to the enterprise network appearing to originate from the endpoint, and the control module sending packets from the enterprise network received by the endpoint through the IP tunnel; and
   providing the network service to the enterprise network via the IP tunnel and bridge.

2. The computer-implemented method of claim 1, wherein the tunnel is formed at a layer of an Open Systems Interconnection model.

3. The computer-implemented method of claim 1, further comprising:
   allocating a unique private IP address space to the enterprise network;
   inventorying the enterprise network to identify a plurality of endpoints on the enterprise network, ones of the plurality of endpoints identified with enterprise network IP addresses in an enterprise address space; and
   assigning service platform IP addresses within the unique private IP address space to identified ones of the plurality of endpoints.

4. The computer-implemented method of claim 3, further comprising:
   translating IP addresses in network traffic received by the services platform from the enterprise network via the IP tunnel from enterprise network IP addresses to corresponding service platform IP addresses; and
   translating IP addresses in network traffic destined from the services platform to the enterprise network via the IP tunnel from services platform IP addresses to corresponding IP enterprise network addresses.

5. The computer-implemented method of claim 3, wherein the services platform provides network services to a plurality of remote enterprise networks and wherein a different unique private IP address space is allocated to each of the plurality of enterprise networks.

6. The computer-implemented method of claim 1, wherein providing the network service to the enterprise network comprises providing one or more network services from the set consisting of:
   vulnerability management, configuration auditing, file integrity monitoring, and compliance auditing.

7. A services platform for providing a network service to a remote enterprise network comprising:
   a non-transitory computer-readable storage medium storing executable computer program modules; and
   a computer processor for executing the computer program modules for performing steps comprising:
   providing a control module to an endpoint of the remote enterprise network responsive to a request for the network service from a user of the endpoint;
   establishing an Internet Protocol (IP) tunnel between the services platform and the endpoint responsive to execution of the control module on the endpoint;
   establishing a bridge between the IP tunnel and the enterprise network responsive to the execution of the control module on the endpoint, wherein establishing the bridge comprises the control module using packet injection at the endpoint to inject packets from the IP tunnel to the enterprise network, the packets injected to the enterprise network appearing to originate from the endpoint, and the control module sending packets from the enterprise network received by the endpoint through the IP tunnel; and
   providing the network service to the enterprise network via the IP tunnel and bridge.

8. The services platform of claim 7, wherein the tunnel is formed at a layer of an Open Systems Interconnection model.

9. The services platform of claim 7, further comprising:
   allocating a unique private IP address space to the enterprise network;
   inventorying the enterprise network to identify a plurality of endpoints on the enterprise network, ones of the plurality of endpoints identified with enterprise network IP addresses in an enterprise space; and
   assigning service platform IP addresses within the unique private IP address space to identified ones of the plurality of endpoints.

10. The services platform of claim 9, further comprising:
    translating IP addresses in network traffic received by the services platform from the enterprise network via the IP tunnel from enterprise network IP addresses to corresponding service platform IP addresses; and
    translating IP addresses in network traffic destined from the services platform to the enterprise network via the IP tunnel from services platform IP addresses to corresponding IP enterprise network addresses.

11. The services platform of claim 9, wherein the services platform provides network services to a plurality of remote enterprise networks and wherein a different unique private IP address space is allocated to each of the plurality of enterprise networks.

12. The services platform of claim 7, wherein providing the network service to the enterprise network comprises providing one or more network services from the set consisting of:
    vulnerability management, configuration auditing, file integrity monitoring, and compliance auditing.

13. A non-transitory computer-readable storage medium storing executable computer program modules for enabling a services platform to provide a network service to a remote enterprise network, the modules comprising:
- an interaction module for interacting with a user of an endpoint of the enterprise network to enable the user to request the network service from the services platform;
- a tunnel creation module for creating an IP tunnel between the endpoint and the services platform responsive to the request for the network service from the user of the endpoint; and
- a bridging module for bridging the IP tunnel with the enterprise network, wherein bridging the IP tunnel with the enterprise network comprises using packet injection at the endpoint to inject packets from the IP tunnel to the enterprise network, the packets injected to the enterprise network appearing to originate from the endpoint, and sending packets from the enterprise network received by the endpoint through the IP tunnel;
- wherein the services platform provides the requested network service via the IP tunnel bridged with the enterprise network.

14. The non-transitory computer-readable storage medium of claim 13, wherein the network service comprises a network service from the set consisting of:
- vulnerability management, configuration auditing, file integrity monitoring, and compliance auditing.

* * * * *